US012508631B2

(12) United States Patent
Smith et al.

(10) Patent No.: US 12,508,631 B2
(45) Date of Patent: Dec. 30, 2025

(54) SYSTEM AND METHOD FOR CLEANING MOBILE DEVICES

(71) Applicant: Communications Test Design, Inc., West Chester, PA (US)

(72) Inventors: Ryan Smith, Phoenixville, PA (US); Nidhin Davis, Glen Mills, PA (US); Kartik Patel, West Chester, PA (US); Christopher Mandeen, West Chester, PA (US); Jaclyn Domsohn, West Chester, PA (US); Manickavel Ganesan, West Chester, PA (US)

(73) Assignee: Communications Test Design, Inc., West Chester, PA (US)

( * ) Notice: Subject to any disclaimer, the term of this patent is extended or adjusted under 35 U.S.C. 154(b) by 119 days.

(21) Appl. No.: 18/499,861

(22) Filed: Nov. 1, 2023

(65) Prior Publication Data

US 2025/0135503 A1 May 1, 2025

(51) Int. Cl.
*B08B 1/14* (2024.01)
*B08B 1/20* (2024.01)
(Continued)

(52) U.S. Cl.
CPC ................ *B08B 1/143* (2024.01); *B08B 1/20* (2024.01); *B08B 3/04* (2013.01); *B08B 5/023* (2013.01); *B08B 13/00* (2013.01); *B65G 45/10* (2013.01)

(58) Field of Classification Search
CPC ........... B08B 13/00; B08B 1/20; B08B 1/143; B08B 3/022; B08B 1/32; B08B 5/023;
(Continued)

(56) References Cited

U.S. PATENT DOCUMENTS 4,696,501 A * 9/1987 Webb ..................... B25J 13/082 414/730
4,953,689 A * 9/1990 Peterson ................ B65G 45/16 15/256.51
(Continued)

FOREIGN PATENT DOCUMENTS

CN 103990624 A * 8/2014 ............... B08B 3/02
CN 106076944 A * 11/2016 ............. B08B 13/00
(Continued)

OTHER PUBLICATIONS

International Search Report and Written Opinion for PCT International Application No. PCT/US2024/010095 dated Apr. 17, 2024, 9 pages.

*Primary Examiner* — David G Cormier
*Assistant Examiner* — Thomas Bucci
(74) *Attorney, Agent, or Firm* — Duane Morris LLP

(57) ABSTRACT

An automated cleaning system for a mobile device includes a conveyor to move the mobile device through the cleaning system; a first wiper to wipe an automatically dispensed cleaning solution from a first major surface of the mobile device; a first mobile device flipper to flip the mobile device 180 degrees; a side cleaner to clean four sides of the mobile device; a second wiper to wipe an automatically dispensed cleaning solution from a second major surface of the mobile device; and a smudge remover to remove smudges from the first major surface or the second major surface of the mobile device.

10 Claims, 11 Drawing Sheets

(51) Int. Cl.

| | |
|---|---|
| ***B08B 3/04*** | (2006.01) |
| ***B08B 5/02*** | (2006.01) |
| ***B08B 13/00*** | (2006.01) |
| ***B65G 45/10*** | (2006.01) |

(58) Field of Classification Search

CPC .... B08B 3/04; B08B 3/02; B08B 1/12; B08B 1/30; B08B 1/165; B08B 3/024; B08B 9/087; B08B 7/04; B08B 1/10; B08B 7/00; B08B 1/14; B08B 9/0808; B08B 2203/02; B08B 9/0436; B08B 9/30; B08B 1/36; B08B 1/16; B08B 1/145; B65G 45/24; B65G 45/10; B65G 47/24; B65G 45/16; B65G 45/12; B65G 45/22; B65G 45/18; B65G 47/22; B65G 45/14; A61L 2/24

USPC .............................................................. 134/61

See application file for complete search history.

(56) References Cited

U.S. PATENT DOCUMENTS

| | | | | |
|---|---|---|---|---|
| 10,842,896 | B1 * | 11/2020 | Mehra | G06Q 20/027 |
| 11,033,645 | B1 * | 6/2021 | Mora | A61L 2/26 |
| 11,667,475 | B1 * | 6/2023 | Kane | B08B 13/00<br>198/494 |
| 2017/0225206 | A1 * | 8/2017 | Deitchman | B08B 1/34 |
| 2017/0279945 | A1 * | 9/2017 | Parsons | A47B 87/00 |
| 2019/0374664 | A1 * | 12/2019 | Kay | A61L 2/10 |
| 2020/0114398 | A1 * | 4/2020 | Kay | H02J 7/0044 |
| 2022/0031881 | A1 * | 2/2022 | Barrios Sierra | A61L 2/24 |

FOREIGN PATENT DOCUMENTS

| | | | | | |
|---|---|---|---|---|---|
| CN | 106269591 | A | * | 1/2017 | B08B 7/0028 |
| CN | 108067449 | A | * | 5/2018 | B08B 15/007 |
| CN | 108080299 | A | * | 5/2018 | B08B 3/02 |
| CN | 108554870 | A | * | 9/2018 | B08B 1/32 |
| CN | 108906829 | A | * | 11/2018 | B08B 11/00 |
| CN | 109013519 | A | * | 12/2018 | B08B 3/04 |
| CN | 109454060 | A | * | 3/2019 | B08B 3/022 |
| CN | 109848162 | A | * | 6/2019 | B08B 11/02 |
| CN | 110203697 | A | * | 9/2019 | B65G 49/067 |
| CN | 110215530 | A | * | 9/2019 | A61L 2/24 |
| CN | 111282883 | A | * | 6/2020 | B08B 3/02 |
| CN | 111921959 | A | * | 11/2020 | B08B 13/00 |
| CN | 112319912 | A | * | 2/2021 | B08B 3/02 |
| CN | 112916454 | A | | 6/2021 | |
| CN | 113198782 | A | * | 8/2021 | B08B 3/022 |
| CN | 113210307 | A | * | 8/2021 | B08B 1/143 |
| CN | 113305071 | A | * | 8/2021 | B08B 13/00 |
| CN | 113399337 | A | * | 9/2021 | B08B 13/00 |
| CN | 113663956 | A | * | 11/2021 | B08B 1/20 |
| CN | 111940380 | B | | 1/2022 | |
| CN | 114042665 | A | * | 2/2022 | B08B 13/00 |
| CN | 114392953 | A | * | 4/2022 | F26B 15/18 |
| CN | 114558155 | A | * | 5/2022 | A61L 2/18 |
| CN | 114850160 | A | * | 8/2022 | B08B 3/08 |
| CN | 115120760 | A | * | 9/2022 | A61L 2/14 |
| CN | 115381975 | A | * | 11/2022 | A61L 2/10 |
| CN | 117654940 | A | * | 3/2024 | F26B 21/004 |
| GB | 2596055 | A | * | 12/2021 | A61L 2/26 |
| KR | 20170116832 | A | * | 10/2017 | B08B 1/34 |
| KR | 20180085105 | A | * | 7/2018 | B08B 3/02 |
| KR | 20190130259 | A | * | 11/2019 | B05B 9/0403 |
| KR | 102286121 | B1 | * | 8/2021 | A61L 2/22 |
| WO | WO-2013022768 | A2 | * | 2/2013 | A45C 11/00 |
| WO | WO-2015180076 | A1 | * | 12/2015 | B08B 7/04 |

* cited by examiner

SYSTEM AND METHOD FOR CLEANING MOBILE DEVICES

FIELD OF THE DISCLOSURE

The disclosure relates to a system and method to clean mobile devices. More specifically, this discloses a robotic system and automated method used to clean mobile devices.

BACKGROUND

Mobile devices, including, but not limited to tablets, smartphones, and smart watches have become sophisticated, widespread and pervasive. With the increasing usage of computer network services all over the world, these mobile devices are in great demand. As a result, the cost of returned, used, and refurbished mobile devices has increased. As with any used device, the used mobile device needs to be tested to determine operability and the previous customer data on the used device needs to be erased, deleted, or wiped from memory before resale because of privacy and personal security concerns. Additionally, the used mobile device needs to be cleaned and graded. Depending on the mobile device, a grade or score is assigned to each used device that corresponds to the resale price of the device. As mobile devices become more complex and the number of working parts increases, cleaning, refurbishing, testing, and grading various mobile devices is not only complicated, but also time consuming and expensive.

SUMMARY

An in-line, conveyor-based, robotic grading system can be used to cosmetically grade used mobile devices. Currently, used mobile devices are cleaned prior to cosmetically grading. In one system, mobile devices are placed on conveyors upstream from the grading system after being sprayed with a cleaning solution and wiped dry with microfiber cloths by operators. This cleaning process slows down the loading of the mobile devices into the grading system and cleaning is not consistent. The current disclosure provides is an in-line, conveyor-based, robotic system for cleaning smartphones. Although not limited to, this cleaning process can be performed before grading to provide more consistently clean used mobile devices to the grading process. This will also facilitate greater throughput of mobile devices because operators will not need to clean phones by hand prior to loading the mobile devices into a grading system and the robotic cleaning apparatus is faster than hand cleaning.

Additionally, new mobile devices need to be cleaned after production and prior to shipping. Cleaning mobile devices according to the present disclosure can be performed at any time in their life.

The exemplary embodiments disclosed herein are directed to solving the issues relating to one or more of the problems presented in the prior art, as well as providing additional features that will become readily apparent by reference to the following detailed description when taken in conjunction with the accompanying drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Also, the embodiments of the present disclosure can be embodied as a method, of which an example has been provided. The acts performed as part of the method can be ordered in any suitable way. Accordingly, embodiments can be constructed in which acts are performed in an order different than illustrated, which can include performing some acts concurrently, even though shown as sequential acts in illustrative embodiments.

An object of the invention, among others, is to provide a system and method to automatically clean mobile devices. The method for cleaning a mobile device generally includes maneuvering the mobile devices through a series of robotic cleaning operations to clean the front surface, rear surface, and sides of the mobile devices. This system and method adds automation to accelerate cleaning and consistency of cleaning mobile devices over manual operations.

Disclosed is a modular in-line robotic cleaning system with automated force control linear actuators. The system can use standard linear and rotary actuators, automated sprayers, an automated blower, a fingerprint and smudge removing roller, conveyor belts, and numerous custom parts. The robotic system can be sized and cleaning modules re-ordered to accommodate various mobile devices and cleaning processes.

In one embodiment, an automated cleaning system for a mobile device includes a conveyor to move the mobile device through the cleaning system; a first wiper to wipe an automatically dispensed cleaning solution from a first major surface of the mobile device; a first mobile device flipper to flip the mobile device 180 degrees; a side cleaner to clean four sides of the mobile device; a second wiper to wipe an automatically dispensed cleaning solution from a second major surface of the mobile device; and a first smudge remover to remove smudges from the first major surface or the second major surface of the mobile device.

The system can further include a recording device to record identification information of the mobile device.

The system can further include a second mobile device flipper to flip the mobile device 180 degrees directly after the recording device.

The system can further include a third wiper and/or a second smudge remover between the first wiper and the first mobile device flipper.

The system can further include a cleaning solution dispenser to automatically dispense the cleaning solution onto the mobile device.

In an aspect, the cleaning solution dispenser dispenses an amount of the cleaning solution based on a number of mobile devices that have moved through the cleaning system and a size of the mobile device.

In an aspect, the first mobile device flipper includes an actuator to adjust dimensions of the first mobile device flipper based on a size of the mobile device.

The system can further include a blower to blow a gas over the mobile device.

In another embodiment, a mobile device cleaner includes a plurality of automated devices to wipe all exterior surfaces of a mobile device; and a conveyor to move the mobile device past each of the plurality of automated devices.

The system can further include a flipper to flip the mobile device 180 degrees.

In an aspect, the flipper automatically adjusts for different sizes of mobile devices.

In an aspect, the system further includes an auto-cleaning mechanism to clean the conveyor.

In another embodiment, a method of cleaning a mobile device includes conveying the mobile device through a cleaning system; robotically wiping an automatically dispensed cleaning solution from a first major surface of the mobile device; flipping the mobile device; robotically wiping four sides of the mobile device; robotically wiping an automatically dispensed cleaning solution from a second major surface of the mobile device; and robotically removing smudges from the second major surface of the mobile device.

The method can further include recording identification information of the mobile device.

The method can further include flipping the mobile device 180 degrees directly after the recording.

The method can further include robotically wiping and/or robotically removing smudges from the first major surface of the mobile device twice.

The method can further include dispensing an amount of the cleaning solution based on a number of mobile devices that have moved through the cleaning system and a size of the mobile device.

The method can further include adjusting dimensions of a mobile device flipper based on a size of the mobile device.

The method can further include blowing a gas over the mobile device.

The method can further include robotically removing smudges from the first major surface of the mobile device.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION

Described is an in-line robotic cleaning system and method with automated force control linear actuators. The cleaning system and method can also use conventional linear and rotary actuators, automated sprayers, an automated blower, conveyor belts, and numerous custom 3D-printed parts. The robotic cleaning system and method can be used to clean mobile devices.

Figure 1:
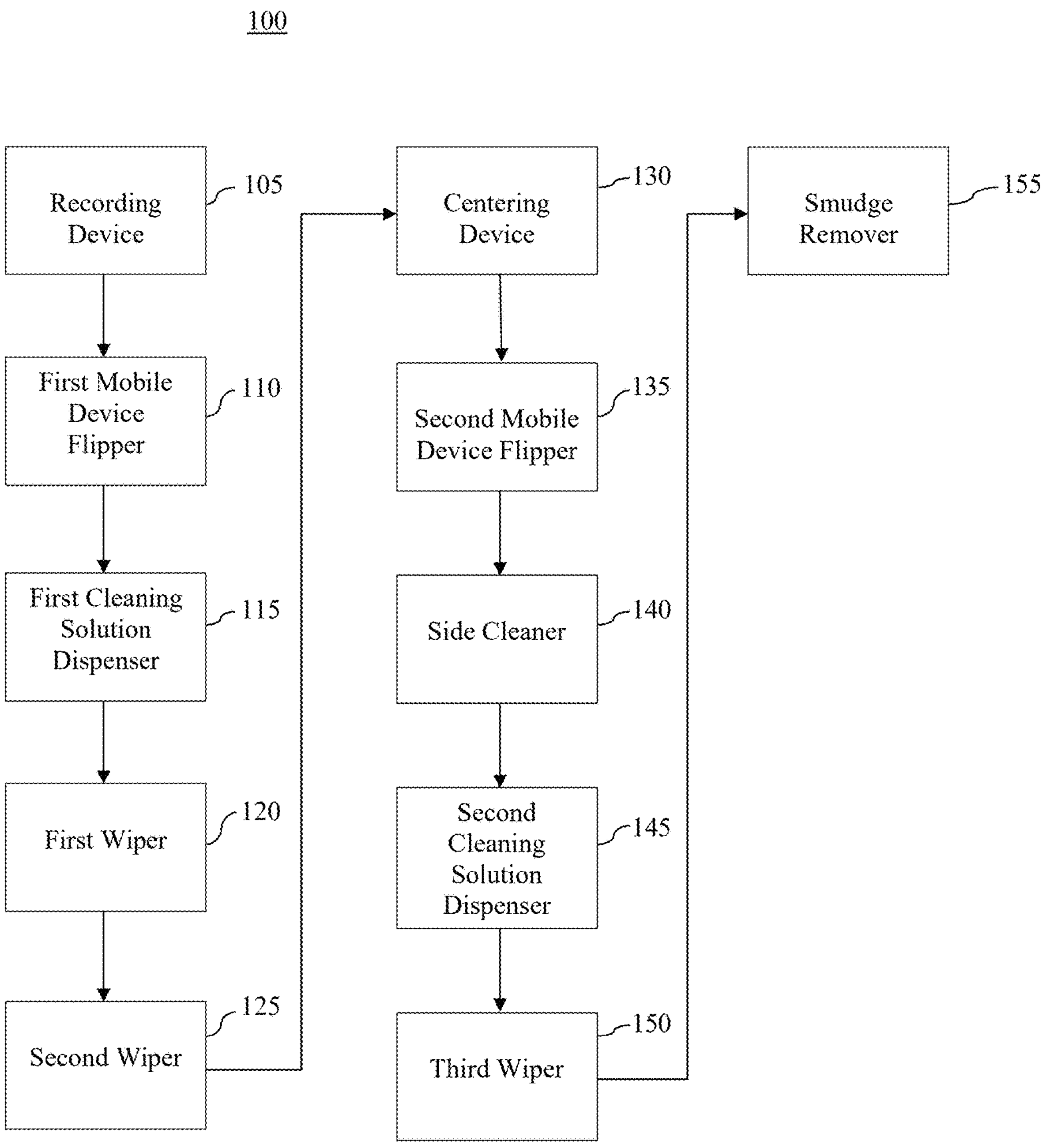
FIG. 1 is a block diagram of a cleaning system, according to an exemplary embodiment.

FIG. 1 is a block diagram of a cleaning system 100 flow, according to an exemplary embodiment. The cleaning system 100 illustrated in FIG. 1 can include a number of individual devices that are arranged in a series to perform various sensing and cleaning functions. Although shown in an order, the order of the cleaning devices can be changed or rearranged to suit desired specifications or particular mobile devices. The cleaning system 100 is a universal robotic system that cleans mobile devices while the mobile devices are being conveyed in a direction passed or through the various cleaning devices or modules. The mobile devices can be conveyed using a conveyor such as a belt, rollers, air table, pick and place, or using any suitable device or method.

A mobile device that is ready for cleaning can enter the cleaning system 100 by any suitable method. For example, a mobile device can be placed on the conveying system by hand or fed from a prior operation or robotic system. Photoelectric sensors can be located along the conveying system to trigger operation of the various robotic cleaning devices as a mobile device is detected while moving through the cleaning system 100.

At 105 an input device can be used to input and/or capture identification information of a mobile device for tracking purposes. The identification information can be any combination of a device make, model, part number, serial number, media access control (MAC) address, or any other suitable unique information. The input device can be a computer in which an operator can use to manually key in or enter the identification information, or an automated device to capture and read the identification information from a label such as a barcode scanner, machine vision system, and the like. If an automated device is used to capture the identification information from a label on a rear of the mobile device as the mobile device is conveyed, the mobile device can be automatically flipped or turned.

Figure 2:
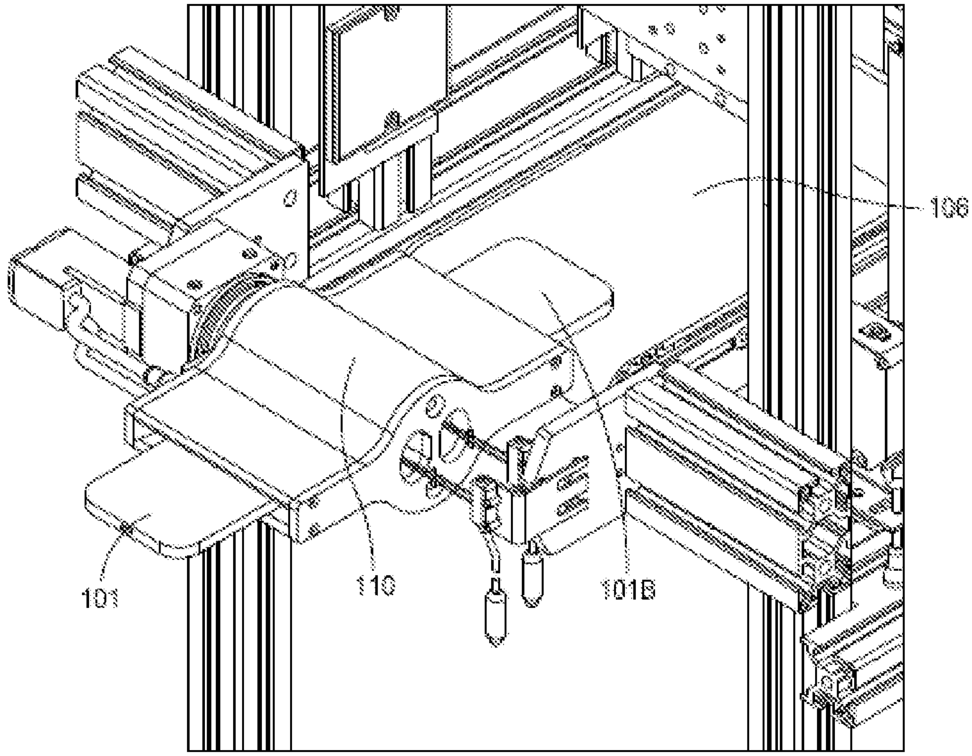
FIG. 2 is a perspective view of a first mobile device flipper.

For example, FIG. 2 shows that a mobile device 101 can be flipped with a first mobile device flipper 110. FIG. 2 shows that the first mobile device flipper 110 can include a fixture mounted to a rotary actuator. The fixture can include a slot in which the mobile device 101 is inserted. The mobile device 101 can be inserted manually or fed into the slot via a conveyor (not shown). The sides of the slot get closer further in to guide the mobile device 101 towards the center of the slot. This helps keep the mobile device 101 centered on a conveyor 106 after it is flipped. Alternatively, the first mobile device flipper 110 can include an actuator that adjusts the dimensions of the slot based on the size of the mobile device 101. The feature can accommodate mobile devices of different sizes serially moving through the system 100 without having to change fixturing for different mobile devices. A proximity sensor can detect that the mobile device 101 is fully inserted and ready to be flipped. Once a mobile device 101 has been detected and an input conveyor is clear, the first mobile device flipper 110 rotates to flip the mobile device 101 180 degrees. The rear side of the mobile device 101 (now facing down), at a second position 101B, makes contact with a second conveyor 106 and is pulled out of the first mobile device flipper 110. A proximity sensor can be used to determine when the first mobile device flipper 110 is empty, and therefore ready to flip another mobile device 101.

In an alternative embodiment, the first mobile device flipper 110 can be included as the first device of the cleaning system 100 depending on how mobile devices are being introduced into the cleaning system 100 and if and how identification information is being recorded. In any case, a major surface of the mobile device 101 being one of the two largest planar sides by area and opposing another major surface that is exposed when the mobile device is rotated 180 degrees.

Figure 3:
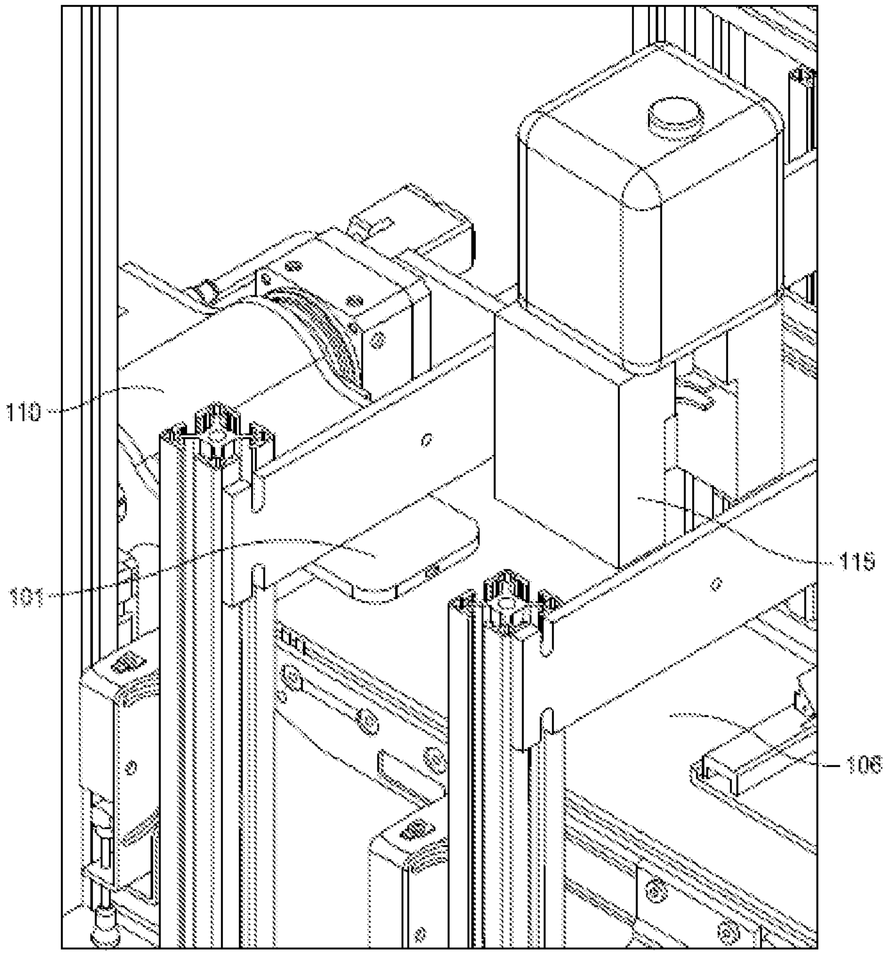
FIG. 3 is a perspective view of a cleaning solution dispenser.

For example, FIG. 3 shows a first cleaning solution dispenser 115 that can dispense a cleaning solution on a major surface of a mobile device 101 as the mobile device 101 passes relative to the first cleaning dispenser 115 via the conveyor 106. The first cleaning dispenser 115 can include a reservoir, tank, or container, to hold a cleaning solution, a pump or pressurization system to force the cleaning solution through a nozzle, spout, or aspirator toward the mobile device 101. Dispensing of the cleaning solution can be synchronized or timed such that the first cleaning solution dispenser 115 outlets a predetermined amount of cleaning solution only onto the mobile device 101. The outlet and amount of dispensed cleaning solution can be configured to match with a particular size mobile device. For example, an outlet can include a different nozzle or different number of nozzles to work with larger or smaller mobile devices. The cleaning solution can be dispensed using pressure such as forced air or by gravity. The cleaning solution can be a sanitizer, alcohol, water, soap, or any other suitable solution. The tank can include a sensor that detects the amount of cleaning solution present or indicate when the cleaning solution is running low. The cleaning solution can be metered via the first cleaning solution dispenser 115 so that an amount of the cleaning solution dispensed is based on use of a wiper in the cleaning station following the first cleaning solution dispenser 115, the number of mobile devices 101 that have passed through, and a size of the mobile device 101.

For example, the first cleaning dispenser 115 can dispense 1 ml to 10 ml of cleaning solution based on the amount of time being dispense and the dispensing pressure. The air pressure can be in the range of 0.1 Mpa (1 bar) to 0.8 Mpa (8 bar). The dispensing time can be in a range of 0.5 sec. to 5 sec. and cycle changes based on an algorithm.

Figure 4:
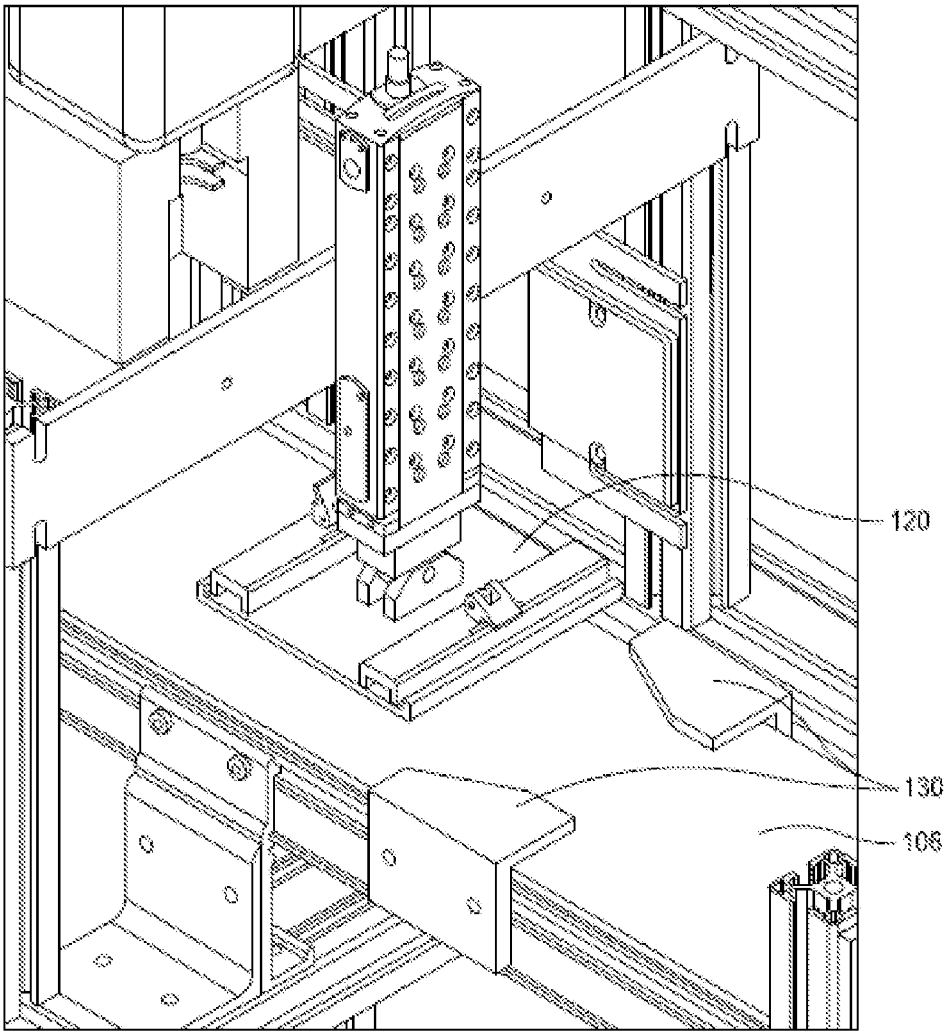
FIG. 4 is a perspective view of a wiper.

After a cleaning solution is dispensed, a first wiper 120 can be moved into contact with the major surface of the mobile device 101. For example, FIG. 4 shows the first wiper 120 can include a fixture with a piece of microfiber or other wiping cloth attached to it is pressed down onto the major surface of the mobile device 101 by a force control actuator to remove the cleaning solution and any dirt or contamination on that surface of the mobile device 101 as the mobile device 101 moves passed the first wiper 120. The force control actuator can control the force of the first wiper 120 to accommodate different thicknesses or thickness tolerances of various mobile devices 101. Although not depicted, the first wiper 120 can be slanted and hinged such that the trailing edge of first wiper 120 is the first portion of the first wiper 120 to contact the mobile device 101. As the mobile device 101 is conveyed with respect to the first wiper 120, the first wiper 120 can touch down on the mobile device 101 with the trailing edge and then rotate so that more of the first wiper 120 contacts the mobile device 101 as it moves by.

Referring to FIG. 1, the mobile device 101 can be cleaned by a second wiper 125 after the first wiper 120. The second wiper 125 can be configured like the first wiper 120 and used to wipe off any residual cleaning solution from the mobile device 101, as shown in FIG. 5.

Figure 5:
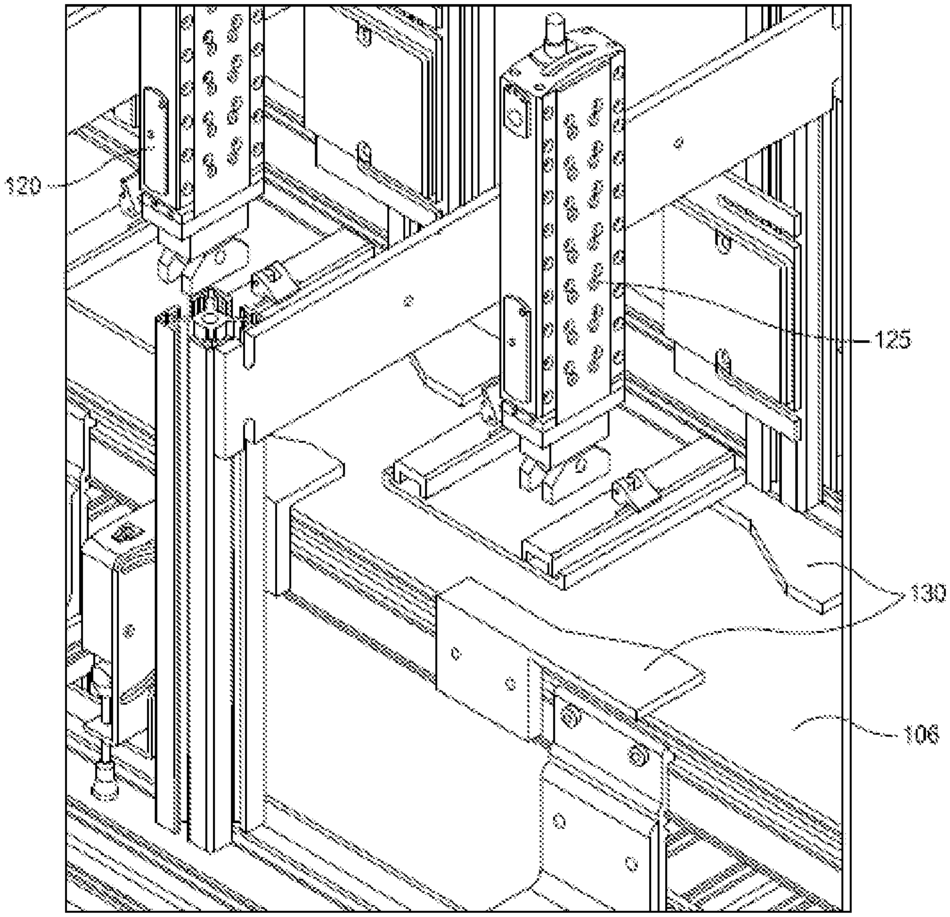
FIG. 5 is a perspective view including a first wiper and a second wiper.

FIGS. 4 and 5 also show that a centering device 130 such as locating brackets can be mounted on both sides of the conveyor 106 after either or both of the first wiper 120 and the second wiper 125 to force the mobile device 101 towards the center of the conveyor 106 and in alignment with the following components of the system 100. The centering device 130 can be positioned before and/or after any of the cleaning devices as needed to maintain relative position of the mobile devices 101 on the conveyor 106 as it is being conveyed through the system 100. After the second wiper 125, the centering device 130 centers the mobile device 101 prior to handling by a second mobile device flipper 135.

The second mobile device flipper 135 can be configured like the first mobile device flipper 110 described above. The mobile device 101 can fit into a slot in the second mobile device flipper 135 and then be rotated 180 degrees so that the display of the mobile device 101 is facing a conveyor 107 and rear of the mobile device 101 is exposed.

Figure 6:
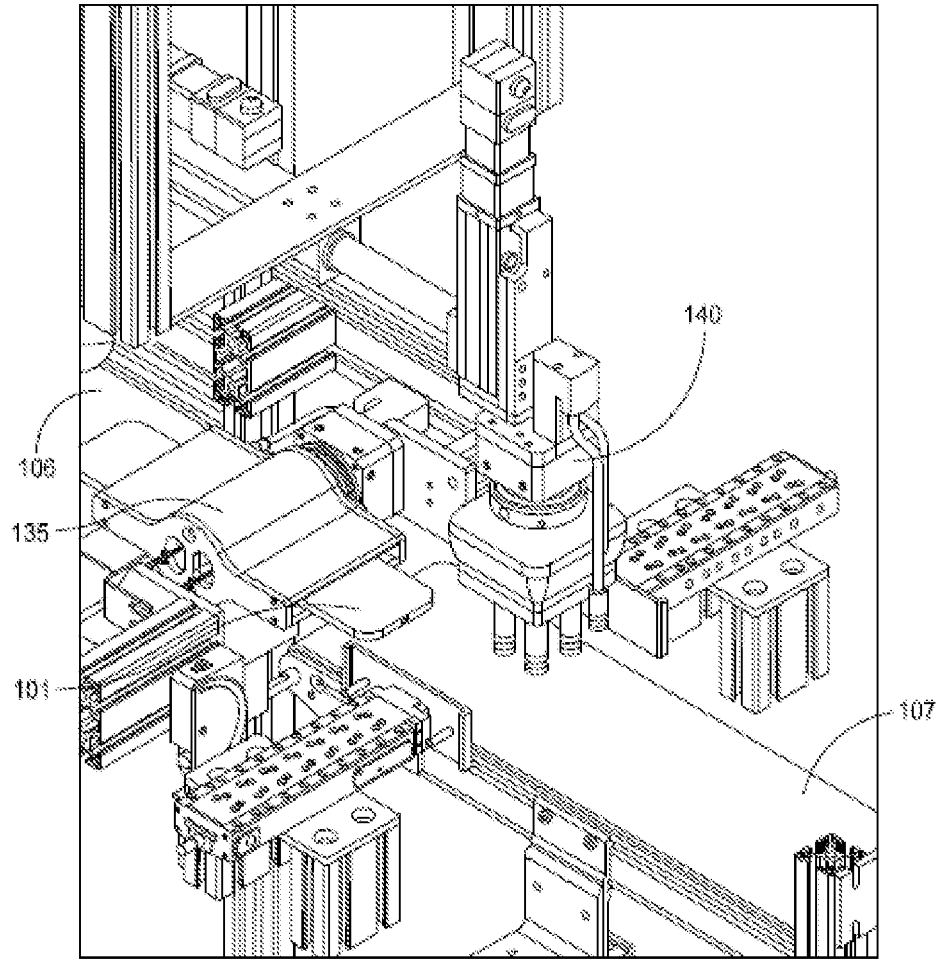
FIG. 6 is a perspective view of a second mobile device flipper and a side cleaner.

FIG. 6 shows a transition zone of the cleaning system 100 that can include the conveyor 106, the second mobile device flipper 135, the mobile device 101 that has been flipped, and the conveyor 107. FIG. 6 shows that after the mobile device 101 has been flipped, it can enter a side cleaner 140. The side cleaner 140 can include at least two force control actuators mounted on either side of the conveyor 107 to press fixtures with a cleaning cloth such as a microfiber cloth clamped to them in towards the mobile device 101 to center the mobile device on the conveyor 107. As a portion of the side cleaner 140, a suction gripper can be mounted to a 3-axis (two linear, one rotary) gantry and lowered onto the mobile device 101 to take hold of the mobile device 101. The mobile device 101 can be lifted by the suction gripper, and the two force control actuators pressed against the sides of the mobile device 101 again. The force control actuators can adjust their force based on the side dimensions of the mobile device 101. With the force control actuators still pressed against it, the mobile device 101 is moved forward to rub the sides of the mobile device 101 against the cleaning cloth. The force control actuators retract, and the rotary axis rotates 90 degrees for cleaning of the two remaining sides of the mobile device 101. The force control actuators press against the sides of the other sides of the mobile device 101 and the mobile device 101 is moved backward to rub the other sides of the mobile device 101 against the cleaning cloth. The force control actuators retract, and the rotary axis rotates 90 degrees to return the mobile device 101 to its previous orientation. The suction gripper places the mobile device 101 back on the conveyor 107.

Now with one major surface and the sides of the mobile device 101 cleaned, the mobile device 101 can be conveyed to a second cleaning solution dispenser 145 which is followed by a third wiper 150, as shown in FIG. 1. The second cleaning solution dispenser 145 and the third wiper 150 can operate to dispense cleaning solution onto the exposed surface of the mobile device 101 and wipe this surface clean as describe above with respect to the first cleaning solution dispenser 115 and the first wiper 120. As such, more detailed descriptions of the second cleaning solution dispenser 145 and the third wiper 150 will not be repeated for brevity. The cleaning solution dispensers 115 and 145 can be configured to dispense a solution that is compatible with any suitable material including glass, stainless steel, titanium, aluminum, an alloy, plastic, etc.

Figure 7:
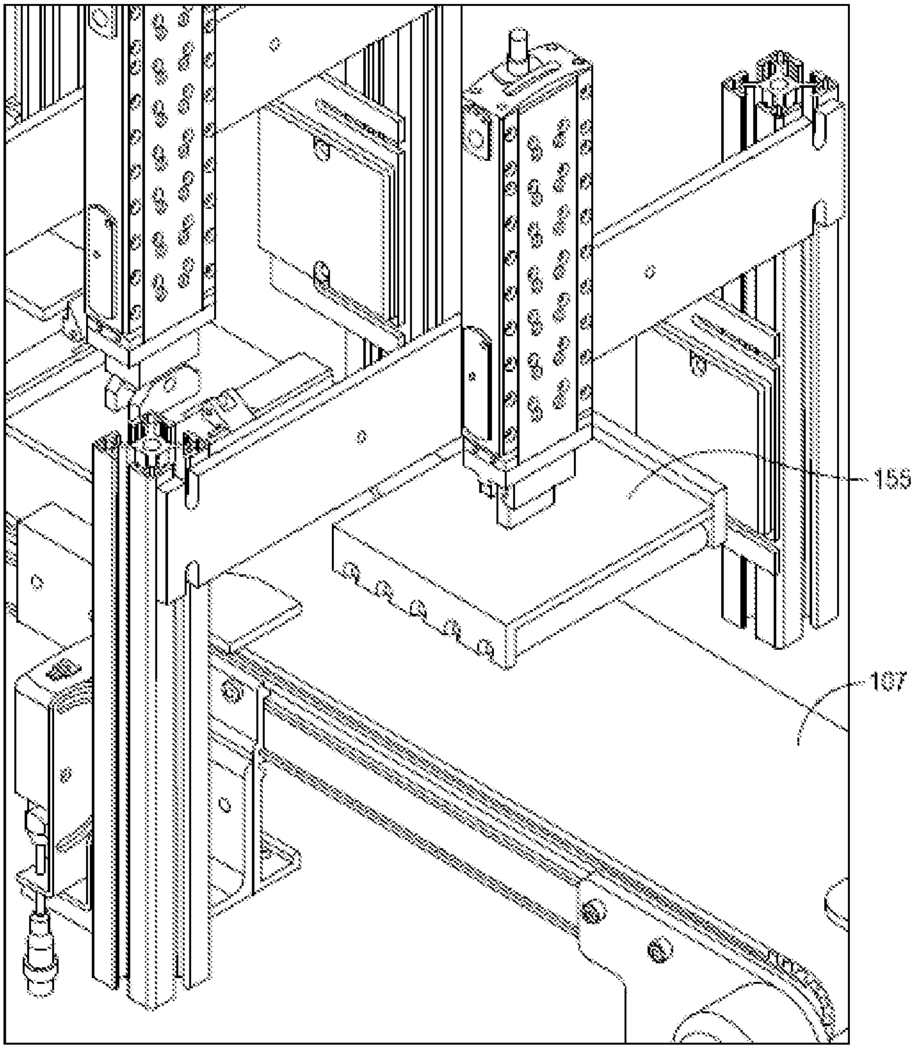
FIG. 7 is a perspective view of a smudge remover.

FIG. 1 shows that a smudge remover 155 can be located after the third wiper 150. For example, FIG. 7 shows the smudge remover 150 can include a fixture mounting a sticky pad that is pressed down onto the major surface of the mobile device 101 by a force control actuator to remove any smudges, fingerprints, and excess dirt as the mobile device 101 is being conveyed passed. As shown, the sticky pad can be a series of iRollers®, for example. The number and length of iRollers® can be of any suitable number and size for the application or fit to the mobile device 101. Alternatively, a smudge remover can be located before the second mobile device flipper.

In another aspect of the disclosure, an additional wiper can be included between the third wiper 150 and the smudge remover 155. The additional wiper can be included to remove any remaining cleaning solution and dirt remaining after the third wipe.

Figure 8:
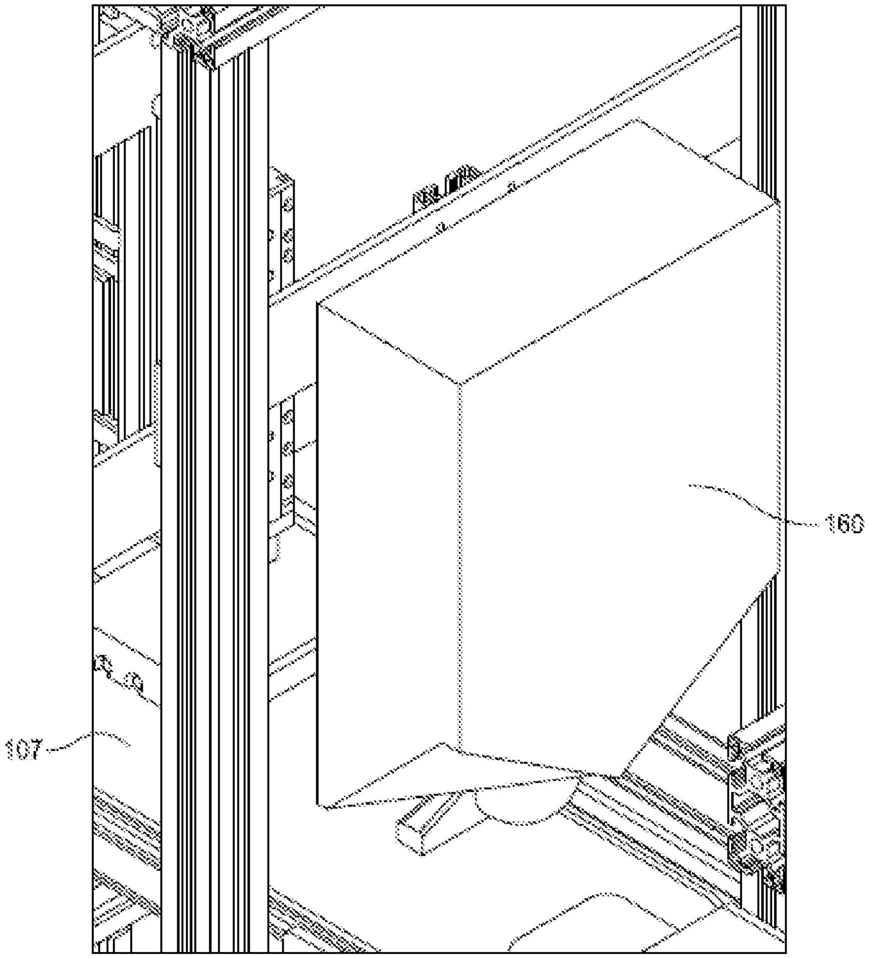
FIG. 8 is a perspective view of a blower.

In another aspect of the disclosure, a blower 160 can be mounted above any conveyor in the system 100 to clear away any remaining cleaning solution/dirt from any surface of the mobile device 101. For example, FIG. 8 shows that a blower 160 can include an air box and a nozzle to direct a gas to the surface of the mobile device 101. The gas can be air, nitrogen, or any other suitable gas or mixture of gases. The blower 160 can be used to blow out cleaning solution/dirt from grooves or crevices of the mobile devices such as an area surrounding a camera lens, connector, or buttons of the mobile device 101 or help to evaporate any residual cleaning solution.

Figure 10:
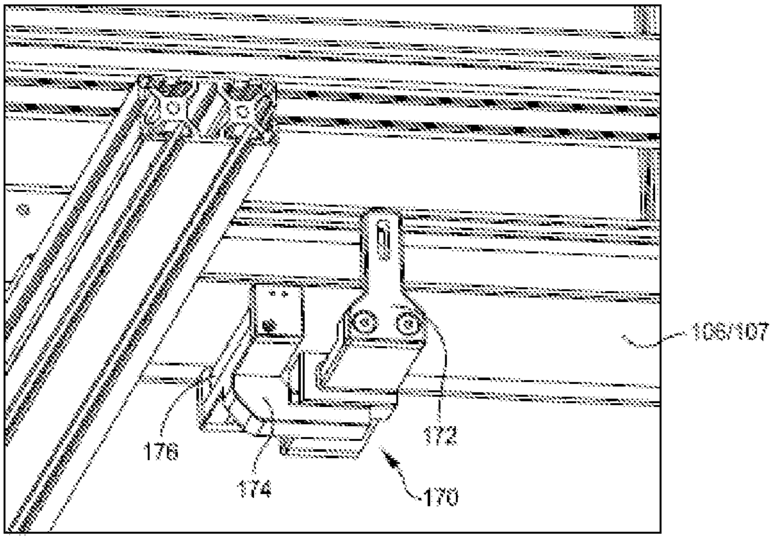
FIG. 10 is a perspective view of an auto-cleaning mechanism mounted to a conveyor.
Figure 11:
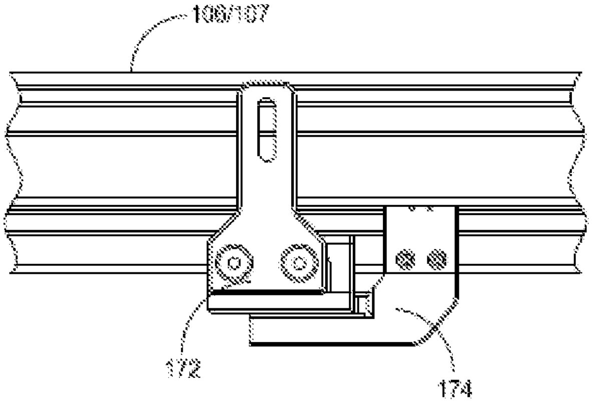
FIG. 11 is a side view of the auto-cleaning mechanism mounted to the conveyor.

In another aspect of the disclosure, while moving, the conveyors 106 and/or 107 can be continuously cleaned using an auto-cleaning mechanism 170. The auto-cleaning mechanism 170 can use a smudge remover 176 (e.g. an iRoller®) to collect dust, dirt, and other particles from the conveyor 106/107 as it runs to ensure the conveyor 106/107 is clean and not transferring any particulates to the mobile device being transported on the conveyor 106/107. FIG. 10 is a perspective view and FIG. 11 is a side view illustrating the auto-cleaning mechanism 170 as mounted.

Figure 12:
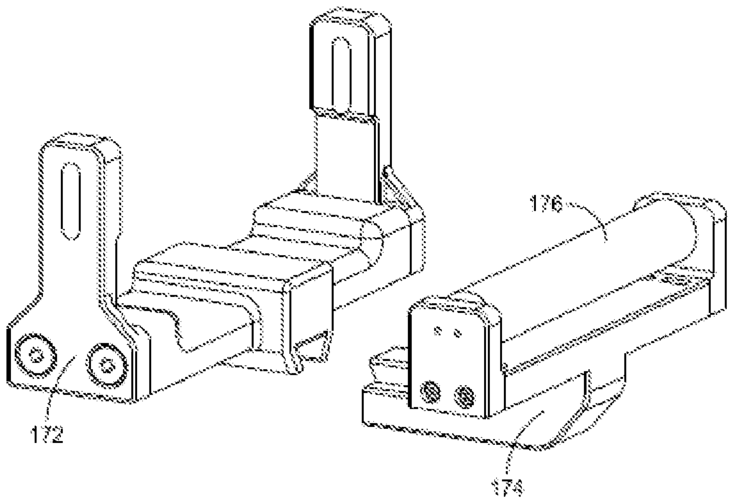
FIG. 12 is a view of components of the auto-cleaning mechanism.

As shown in FIG. 12, the auto-cleaning mechanism 170 can include three main components, a mounting component 172, a removable component 174, and a smudge remover 176. The mounting component 172 can be fixed from an underside of a conveyor 106/107. The mounting component 172 can be mounted anywhere along the length of the conveyor 106/107 and below the conveyor 106/107 so as not to disturb the mobile devices resting on top and moving along the conveyor 106/107. The mounting component 172 can use a female dovetail geometry or any suitable method to mate with and secure the removable component 174 so that the smudge remover 176 attached to the bearing component 174 can be easily removed to be cleaned or replaced as needed.

The removable component 174 and the smudge remover 176 are attached using ball bearings to allow for smooth rotation of the smudge remover 176 around an axis parallel to a plane of the conveyor 106/107. The removable component 174 can be inserted into the mounting component 172 to allow the auto cleaning to take place.

The auto-cleaning mechanism 170 is mounted and aligned so that the smudge remover 176 is against the conveyor 106/107, making enough contact to remove particles while not disturbing conveying movement. Movement of the conveyors 106/107 while the auto-cleaning mechanism 170 is fixed in place allows for the entirety of the belt of conveyors 106/107 to be cleaned during use.

Figure 9:
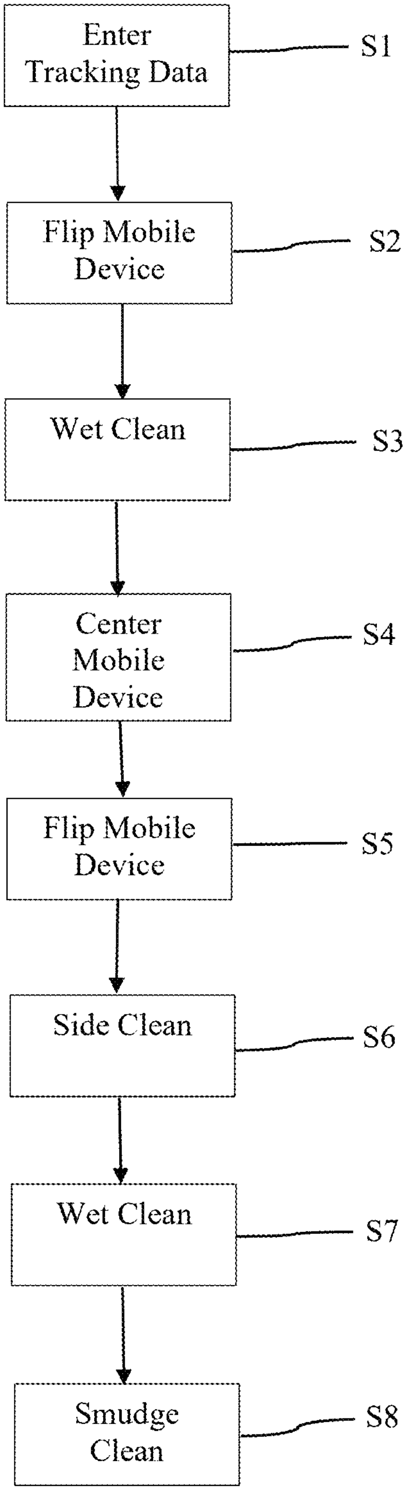
FIG. 9 is a flow chart of a method of cleaning, according to an exemplary embodiment.

FIG. 9 is a flowchart illustrating a method of cleaning a mobile device. The steps of the method described with respect to FIG. 9 can be automatically performed by the robotic cleaning and mobile device handling devices previously described to increase speed and consistency in cleaning mobile devices that are conveyed through the system 100. Although shown in an order, the steps can be performed in any order suitable to adequately clean a mobile device of interest.

In step S1, tracking data for a mobile device can be recorded. Unique identification information for a particular mobile device can be manually or automatically entered into a device traveler, a digital record, a graphic user interface, or any other suitable location. For example, a barcode scanner can be used to scan a label, QR code, media access control (MAC) address, or any other information identifying a particular mobile device.

In step S2, if the unique identification information is entered while the mobile device is face down, the mobile device can be flipped so that the surface with the electronic display is facing up.

In step S3, a wet clean can be performed. The wet clean can include dispensing a cleaning solution from an automated cleaning solution dispenser onto a first major surface of a mobile device and pressing a cleaning cloth to the first major surface to wipe the cleaning solution and dirt and/or contamination from the mobile device with a robotic wiper. The major surface can be wiped a second time. The first major surface can include a surface of the electronic display and surrounding bezel, case, or chassis.

In step S4, the mobile device can be centered on a conveying system.

In step S5, the mobile device can be flipped. The mobile device can be flipped 180 degrees so that the now cleaned first major surface is facing away from the cleaning devices, toward the conveyor, and exposing a second major surface of the mobile device.

In step S6, a side clean can be performed. The side clean can include taking lifting the mobile device from the conveyor, pressing cleaning cloth to two sides of the mobile device, rotating the mobile device 90 degrees, pressing cleaning cloth to two other sides of the mobile device, and setting the mobile device back onto the conveyor.

In step S7, a wet clean can be performed of the second major surface like that described with respect to step S3.

In step S8, a smudge clean can be performed of the second major surface. The smudge clean can include pressing a sticky pad onto the major surface of the mobile device to remove any smudges, fingerprints, and excess dirt as the mobile device is being conveyed.

Optionally, a blow clean can be performed in a suitable position of the process. The blow clean can include forcing a gas to clear away any remaining cleaning solution/dirt from the major surface of the mobile device.

The foregoing illustrates some of the possibilities for practicing the disclosure. Many other embodiments are possible within the scope and spirit of the disclosure. Therefore, more or less of the aforementioned components can be used to conform to that particular purpose. It is, therefore, intended that the foregoing description be regarded as illustrative rather than limiting, and that the scope of the disclosure is given by the appended claims together with their full range of equivalents.

What is claimed is:

1. An automated cleaning system for a mobile device, comprising:

a conveyor to move the mobile device through the cleaning system;

a first wiper to wipe an automatically dispensed cleaning solution from a first major surface of the mobile device;

a first mobile device flipper to flip the mobile device 180 degrees;

a side cleaner to clean four sides of the mobile device;

a cleaning solution dispenser to automatically dispense cleaning solution onto the mobile device;

a second wiper to wipe an automatically dispensed the cleaning solution from a second major surface of the mobile device; and a first smudge remover to remove smudges from the first major surface or the second major surface of the mobile device, wherein the cleaning solution dispenser dispenses an amount of the cleaning solution based on use of a wiper in a cleaning station following the cleaning solution dispenser, a number of mobile devices that have moved through the cleaning system, and a size of the mobile device.

2. The system of claim 1, further comprising a recording device to record identification information of the mobile device.

3. The system of claim 2, further comprising a second mobile device flipper to flip the mobile device 180 degrees directly after the recording device.

4. The system of claim 1, further comprising a third wiper and/or a second smudge remover between the first wiper and the first mobile device flipper.

5. The system of claim 1, wherein the first mobile device flipper includes an actuator to adjust dimensions of the first mobile device flipper based on a size of the mobile device.

6. The system of claim 1, further comprising a blower to blow a gas over the mobile device.

7. The system of claim 1, further comprising an auto-cleaning mechanism to clean the conveyor.

8. A mobile device cleaner, comprising:

a plurality of automated devices to wipe all exterior surfaces of a mobile device;

a cleaning solution dispenser to automatically dispense cleaning solution onto the mobile device; and a conveyor to move the mobile device past each of the plurality of automated devices, wherein the cleaning solution dispenser dispenses an amount of the cleaning solution based on use of a wiper in a cleaning station following the cleaning solution dispenser, a number of mobile devices that have moved through the cleaning system, and a size of the mobile device.

9. The mobile device cleaner of claim 8, further comprising a flipper to flip the mobile device 180 degrees.

10. The mobile device cleaner of claim 9, wherein the flipper automatically adjusts for different sizes of mobile devices.

* * * * *